Patented Jan. 30, 1923.

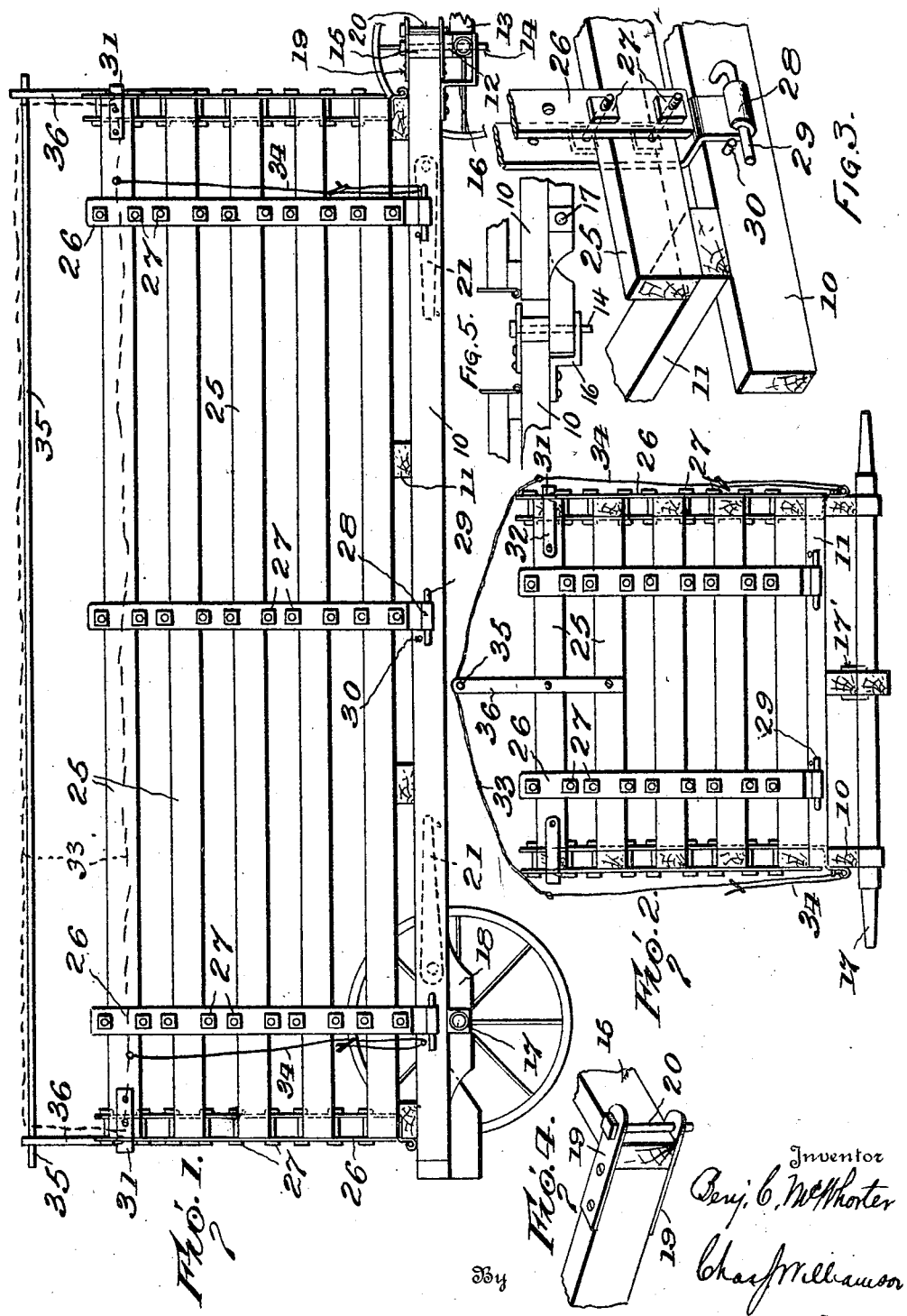

1,443,712

UNITED STATES PATENT OFFICE.

BENJAMIN CULLEN McWHORTER, OF ACKERMAN, MISSISSIPPI.

HAY CAR.

Application filed July 22, 1916. Serial No. 110,746.

*To all whom it may concern:*

Be it known that I, BENJAMIN C. Mc-WHORTER, a citizen of the United States, and resident of Ackerman, in the county of Choctaw, and in the State of Mississippi, have invented a certain new and useful Improvement in Hay Cars, and do hereby declare that the following is a full, clear, and exact description thereof.

The object of my invention is to provide a hay holding and transporting device in which the green hay may be at once placed when cut, and in which it may remain for curing, if desired and transported to the barn for storage, or for baling; which can be readily converted into a hay rack; and admit of a number being coupled together for hauling along as a train, so to speak; and which can be placed in a knocked down condition to secure compactness for storage, and for the attainment of these objects and others, which will be evident to those skilled in the art, my invention consists in the car constructed substantially as hereinafter specified and claimed.

In the accompanying drawings—

Fig. 1 is a side elevation of a car embodying my invention;

Fig. 2 is a rear elevation thereof;

Fig. 3 is a detail view in perspective of one of the end portions of the car.

Fig. 4 is a detail view in perspective showing the connection between the front and side sills.

Fig. 5 is a detail view of the front and rear portions of two coupled cars.

My car has a base, or platform composed of several longitudinally extending sills 10, and a series of spaced cross bars 11, suitably secured to the sills and providing an open-work structure, which, while it adequately supports the hay placed in the car affords ample ventilation and renders the construction a light one. The platform rests upon a pivoted wheel front axle and bolster 12, to which a draft tongue 13 is attached, a king bolt 14 passing through the front cross bar 15 of the platform, and through a bracket, or clevis 16 on the underside of the middle longitudinal sill, and upon a wheeled rear axle 17, which is seated near each end in a downwardly opening slot 18 in the underside of the outer platform sill so that when desired the rear axle may be easily disconnected from the platform merely by a downward movement of the axle, or the lifting of the platform. Longitudinal movement of the axle when in position is prevented by bolts or pins 17', on its upper side which engage the adjacent side of the center longitudinal sill. The front cross bar 15 lies between upper and lower plates 19 on the top and bottom, respectively, of the side sills 10, and a bolt 20 passing through holes in said plates in front of said cross bar detachably holds the latter. It will be seen that by removing said bolts and also the king pin 14, the front bolster, axle, wheels and tongue may be removed from the car. In order to support the car when the wheels and axles are removed, I provide four legs 21 which are hinged to the inner side of the side sills 10, so that they may be swung to and from position for use. By making the wheel axles removable I am able to use the same set of axles for a number of cars, the axles being removed from one car as soon as it has been carried to the barn, or other place for the further handling of the hay and attached to another and empty car for hauling to the field and so on. A train of cars, when made up, has no front axles on any of the cars except the first car, all cars after the first having their front axles removed, and adjoining cars are coupled together by connecting the rear end of a preceding car with the front end of the next following car, by passing the king bolt through a hole in the tail end of the center sill, 10, and through the clevis, 16, on the front end of the next following car into which clevis the tail end of the center sill of the preceding car is inserted, the coupling arrangement being shown in Fig. 5. The rear wheels being retained on all of the cars of the train it will be seen that ample support for all of the cars is afforded.

The two sides and the front and back ends of the car are similarly constructed, and in each case the structure is a slatted one consisting of a vertical series of horizontally extending slats 25, and a number of pairs of vertical parallel bars 26, the bars of each pair being spaced apart the width of the slats and being joined by nutted bolts 27 arranged in a vertical series and adapted to engage tops and bottoms of the slats so that horizontally alining vertical series of retaining devices are thus provided into and out of which the slats are movable by a longitudinal movement, so that when desired any desired number of slats may be removed, as for the purpose of providing a hay rack, or replaced, in order to prevent cattle getting at the hay contents of the cars and eating the same. At their bottoms each inside bar 26 is carried down along the outer side of the outer sills 10, or end cross bar 11, and is bent into an eye 28 so that it may engage a pintle 29 in the form of an L-shaped rod driven into the sill. It will be seen that at one end the pintle is free and as all of the pintles are similarly arranged it will be evident that by a sliding movement the easy and quick assemblage and separation of the parts can be performed and the pintles and eyes form a hinge connection so that if desired the sides or ends may be swung downward without removing them from the platform. When the sides or ends are in a vertical position the portion of one or more of the bars 26 which extends over the side of the sill, or bar, is adapted to be engaged by a pin 30 driven into the side of the sill, or bar, and which acts as a stop to prevent the slipping of the bar eye off the pintle 29, but when the side, or end is turned down into a horizontal position it clears the stop pin 30 and it does not obstruct assemblage, or separation of the parts. Preferably the outer bar 26 is of wood, but, of course, it may be made of metal if desired. On the front and rear ends of the top slat of the sides are secured plates 31 having vertical slots in upper sides which are adapted to be engaged by hinge hook plates 32 on the end of the top slat of the end walls.

As a cover I employ a tarpaulin 33, which near each corner has a cord or rope 34 adapted to be caught over the end of an adjacent pintle 29 and resting at its middle on a longitudinally extending rod or bar 35, which is removably supported in holes in the upper ends of an upright, or standard 36 secured to each end wall of the car.

I wish it to be understood I do not limit myself to the details of construction shown in the drawings as embodying the principles of my invention, as the details of construction of the parts may be changed.

Having thus described my invention what I claim is:

Means for holding and transporting hay, comprising units adapted to be connected to form a train, each unit including a platform and means to retain hay thereon, such platform at front and rear having a construction for detachably connecting the rear of a preceding unit and the front of a trailing unit, and wheeled axles each unit frame having means for the detachable connection therewith at front and rear of two wheeled axles.

In testimony that I claim the foregoing I have hereunto set my hand.

BENJAMIN CULLEN McWHORTER.